United States Patent
Kim

(10) Patent No.: US 11,740,602 B2
(45) Date of Patent: Aug. 29, 2023

(54) SMART METER, SYSTEM INCLUDING SAME, AND METHOD FOR CONTROLLING SMART METER

(71) Applicants: NURIFLEX INC., Wilmington, DE (US); NURI TELECOM CO., LTD., Seoul (KR)

(72) Inventor: Min Soo Kim, Gyeonggi-do (KR)

(73) Assignees: NURIFLEX INC., Wilmington, DE (US); NURI TELECOM CO., LTD, Seoul (KR)

(*) Notice: Subject to any disclaimer, the term of this patent is extended or adjusted under 35 U.S.C. 154(b) by 333 days.

(21) Appl. No.: 16/982,687

(22) PCT Filed: Mar. 21, 2018

(86) PCT No.: PCT/KR2018/003288
§ 371 (c)(1),
(2) Date: Sep. 21, 2020

(87) PCT Pub. No.: WO2019/182174
PCT Pub. Date: Sep. 26, 2019

(65) Prior Publication Data
US 2021/0003978 A1    Jan. 7, 2021

(30) Foreign Application Priority Data
Mar. 21, 2018  (KR) .................. 10-2018-0032392

(51) Int. Cl.
*G05B 19/042* (2006.01)
*H02J 3/38* (2006.01)
*H02J 13/00* (2006.01)

(52) U.S. Cl.
CPC .............. *G05B 19/042* (2013.01); *H02J 3/38* (2013.01); *G05B 2219/2639* (2013.01);
(Continued)

(58) Field of Classification Search
CPC . G05B 19/042; G05B 2219/2639; H02J 3/38; H02J 13/00001; H02J 13/00002;
(Continued)

(56) References Cited

U.S. PATENT DOCUMENTS

| | | | |
|---|---|---|---|
| 9,915,965 B2 | 3/2018 | Mohammed et al. | |
| 2009/0326725 A1* | 12/2009 | Carlson | G06Q 50/06 700/297 |

(Continued)

FOREIGN PATENT DOCUMENTS

| | | |
|---|---|---|
| JP | 2012-135125 A | 7/2012 |
| KR | 10-1231704 B1 | 2/2013 |

(Continued)

OTHER PUBLICATIONS

Lo, Chun-Hao, and Nirwan Ansari. "The progressive smart grid system from both power and communications aspects." IEEE Communications Surveys & Tutorials 14.3 (2011): 799-821. (Year: 2011).*

(Continued)

*Primary Examiner* — Ronald D Hartman, Jr.
(74) *Attorney, Agent, or Firm* — Brian B. Shaw, Esq.; Harter Secrest & Emery LLP

(57) ABSTRACT

According to a disclosed aspect, provided is a smart meter, a system including same, and a method for controlling the smart meter, wherein the smart meter actively requests renewable energy through a system according to an electricity billing system so as to prevent an overload of generated power and induce efficient power use. A smart meter according to a disclosed embodiment comprises: a communication unit for communicating with the outside; a power measurement unit for collecting the amount of power consumption from an electronic device; and a control unit for comparing the amount of power consumption with a preset (Continued)

power interval, and requesting renewable energy through the communication unit on the basis of a result of the comparison.

18 Claims, 7 Drawing Sheets

(52) U.S. Cl.
CPC ......... *H02J 3/381* (2013.01); *H02J 13/00001* (2020.01); *H02J 13/00002* (2020.01); *H02J 2300/24* (2020.01); *H02J 2300/28* (2020.01); *H02J 2310/12* (2020.01)

(58) Field of Classification Search
CPC ............... H02J 2300/24; H02J 2300/28; H02J 2310/12; H02J 3/381; Y02E 10/56
See application file for complete search history.

(56) References Cited

U.S. PATENT DOCUMENTS

| | | | |
|---|---|---|---|
| 2011/0196547 A1* | 8/2011 | Park | H02J 3/14 700/296 |
| 2019/0081476 A1* | 3/2019 | Konya | H02J 13/00034 |
| 2021/0003978 A1* | 1/2021 | Kim | H02J 13/00002 |

FOREIGN PATENT DOCUMENTS

| | | | |
|---|---|---|---|
| KR | 101231704 B1 * | 2/2013 | H02J 3/14 |
| KR | 10-2013-0100850 A | 9/2013 | |
| KR | 10-1641118 B1 | 7/2016 | |

OTHER PUBLICATIONS

International Search Report from corresponding International Patent Application No. PCT/KR2018/003288, dated Mar. 11, 2019.

* cited by examiner

| INTERVAL | USAGE (UNIT: KWH) | APPLIED AMOUNT (UNIT: WON) |
|---|---|---|
| A | 0~100 | 410WON |
| B | 101~200 | 910WON |
| C | 201~300 | 3,850WON |
| D | 301~400 | 7,300WON |
| E | 401~500 | 12,940WON |

SMART METER, SYSTEM INCLUDING SAME, AND METHOD FOR CONTROLLING SMART METER

TECHNICAL FIELD

The present invention relates to a smart meter using a power rate system, a system including the same, and a method for controlling the smart meter.

BACKGROUND ART

With the growing importance of environmentally friendly energy use and management around the world, a smart grid business is rapidly being promoted.

Smart grid which is a next-generation intelligent power grid technology that maximizes energy efficiency by grafting information and communication technology to the existing power grid and exchanging real-time information between power providers and consumers bidirectionally provides benefits such as enhancement of stability of power supply, environmental preservation through improvement of efficiency of energy use, and financial benefits.

As such smart grid business is promoted, smart metering, which is an essential technology of smart grid, is spreading widely. The smart metering which is a fusion of embedded intelligence and communication functions with existing metering equipment periodically collects and gathers metering information from residential, commercial and industrial facilities and provides the metering information to service providers.

The metering equipment may be classified according a type thereof, but the most common metering equipment is a smart meter that measures power energy usage. The smart meter is a power meter that measures amount of power consumption and transmits the amount of power consumption to a smart grid system through a communication function.

Meanwhile, a conventional general smart meter just serves as a gateway that transmits/receives collected data to a central system of a smart grid through the communication function and has a problem in that the conventional general smart meter does not perform an active operation or function.

DISCLOSURE

Technical Problem

According to an aspect disclosed, provided are a smart meter, a system including the same, and a method for controlling the smart meter which actively request renewable energy through a system according to a power rate system to prevent overload of generated power and derive efficient power use.

Technical Solution

A smart meter according to an embodiment disclosed includes: a communication unit performing communication with the outside; a power measurement unit collecting the amount of power consumption from an electronic device; and a control unit comparing the amount of power consumption with a predetermined power interval and requesting renewable energy through the communication unit based on the comparison result.

The control unit may compare the amount of power consumption with the power interval based on a predetermined range.

The communication unit may request the renewable energy based on a location at which the smart meter is provided.

The control unit may determine the power interval based on a power rate system.

The control unit may determine the power interval based on an input payment rate when the power rate system is a prepaid accumulation rate system.

The control unit may request the renewable energy to the outside based on a required amount of power consumption which the communication unit receives through the electronic device.

A system according to another embodiment disclosed includes: a home network including a smart meter; an energy management system (EMS) storing the renewable energy produced by solar power generation or the home network; and a smart meter supplying the renewable energy received from at least one of the EMS, the home network, and the solar power generation, in which the smart meter includes a communication unit performing communication with the outside, a power measurement unit collecting the amount of power consumption from an electronic device, and a control unit comparing the amount of power consumption with a predetermined power interval and requesting renewable energy through the communication unit based on the comparison result.

The control unit may compare the amount of power consumption with the power interval based on a predetermined range.

The communication unit may request the renewable energy based on a point at which the smart meter is provided.

The control unit may determine the power interval based on a power rate system.

The control unit may determine the power interval based on an input payment rate when the power rate system is a prepaid accumulation rate system.

The control unit may request the renewable energy to the outside based on a required amount of power consumption received through the electronic device.

A method for controlling the smart meter according to yet another embodiment disclosed includes: performing communication with the outside; collecting the amount of power consumption from an electronic device; comparing the amount of power consumption with a predetermined power interval; and requesting renewable energy based on the comparison result.

The comparing may include comparing the amount of power consumption with the power interval based on a predetermined range.

The requesting may include requesting the renewable energy based on a distance from a location at which the smart meter is provided.

The comparing may include determining the power interval based on a power rate system.

The comparing may include determining the power interval based on an input payment rate when the power rate system is a prepaid accumulation rate system.

The requesting may include requesting the renewable energy to the outside based on a required amount of power consumption received through the electronic device.

Advantageous Effects

According to an aspect disclosed, a smart meter, a system including the same, and a method for controlling the smart meter actively request renewable energy through a system according to a power rate system to prevent overload of generated power and derive efficient power use.

BEST MODE

Figure 1:
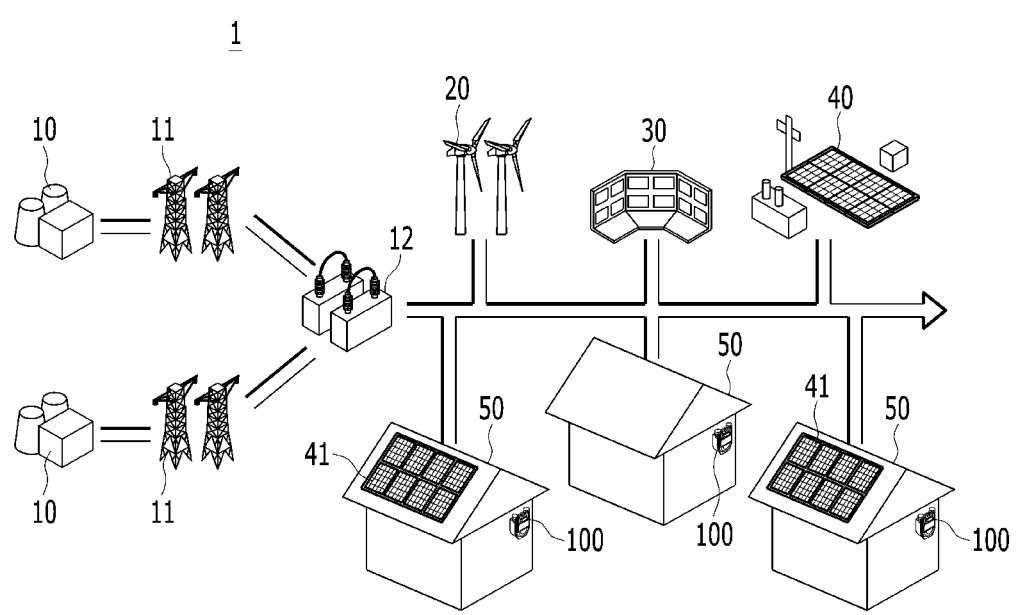
FIG. 1 is a diagram illustrating a system according to an embodiment disclosed.

Like reference numerals refer to like elements throughout the specification. This specification does not describe all elements of the embodiments, and general content or content overlapping between the embodiments in the technical field to which the present invention pertains is omitted. The term 'unit, module, member, block' used in the specification may be implemented as software or hardware, and according to embodiments, a plurality of 'units, modules, members, blocks' may be implemented as one component or it is also possible that one 'unit, module, member, block' includes a plurality of components.

Throughout the specification, when a part is said to be "connected" with another part, this includes not only the case of direct connection, but also the case of indirect connection, and the indirect connection includes connection through a wireless communication network.

Further, when any part "includes" any component, unless explicitly described to the contrary, the word "comprise" and variations such as "comprises" or "comprising", will be understood to imply the inclusion of stated elements but not the exclusion of any other elements.

The terms "first," "second,", and the like are used to distinguish one component from other components, but the component is not limited by the terms.

A singular form includes a plural form unless there is a clear exception in the context.

In each step, reference numerals are used for convenience of description, the reference numerals are not used to describe the order of the steps and unless a specific order is clearly stated in the context, each step may occur differently from the order specified above.

Hereinafter, an operation principle and embodiments of the present invention will be described with reference to the accompanying drawings.

FIG. 1 is a diagram illustrating a system according to an embodiment disclosed.

A system 1 according to the present disclosure is to manage power which is an energy source. Here, the energy source means a resource of which generation amount or usage may be measured. Hereinafter, as an example of the energy source, electricity is described, but the system 1 may also be applied to another energy source.

Referring to FIG. 1, the disclosed system 1 includes a power plant 10 producing the electricity, a transmission line 11 transmitting the produced electricity, and a substation 12 converting voltage.

Specifically, the power plant 10 means a power plant that produces the electricity through thermal power generation or nuclear power generation. The substation 12 allows the electricity to be distributed to demands such as homes or offices.

Further, the disclosed system 1 may include an energy management system (EMS) 30 storing the electricity distributed by the substation 12, and a wind power plant 20 and a solar power plant 40 that produce the renewable energy by using solar power and wind power.

The EMS 30 serves to store the electricity transmitted by the substation 12 and the renewable energy supplied by the power plants 20 and 40 and thereafter, supply required power according to a request from a smart meter 100 to be described below.

A home network 50 means a group that produces, stores, and shares the electricity through solar power or fuel cells mounted on an electric vehicle (EV). Accordingly, the home network 50 is not limited to a term home and includes all demands using the power.

The home network 50 includes various electronic devices 200 (see FIG. 3) which exist indoors or outdoors. Here, the electronic device 200 includes various devices using the power and specifically, the electronic device 20 includes all wearable type user terminals such as a smartphone, a watch, and glasses in addition to home appliances such as a refrigerator, an air-conditioner, a display device, a cleaning robot, lighting equipment, a wine refrigerator, a washing machine, a desktop, etc.

The electronic device 200 may perform Internet of Things (IoT) through an embedded communication module and exchange information by sending and receiving data between the electronic devices. A detailed description thereof will be described below in FIG. 3.

The smart meter 100 may be provided in the disclosed home network 50, which determines the amount of power consumption of the demands (home or office) in real time. The smart meter 100 may measure electricity consumption of the demand in real time and perform communication with another smart meter included in the home network 50 or the EMS 30. Further, the disclosed smart meter 100 shares the power determined based on the power rate system with the home network 50 and the EMS 30. A detailed description of the smart meter 100 will be described below through FIG. 2, etc.

Meanwhile, in the home network 50, a device 41 producing the renewable energy need not particularly be provided. That is, the home network 50 may request required power through the smart meter 100 without autonomously producing the power through the solar power.

Figure 2:
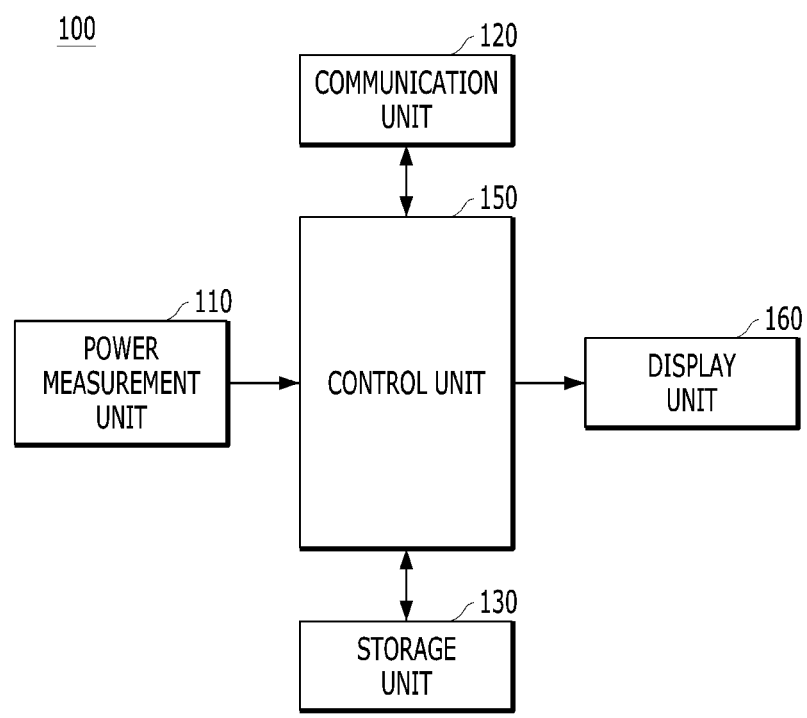
FIG. 2 is a control block diagram for a smart meter according to an embodiment disclosed.

FIG. 2 is a control block diagram for a smart meter according to an embodiment disclosed.

Referring to FIG. 2, the smart meter 100 includes a power measurement unit 110 collecting the amount of power consumption from the electronic device, a communication unit 120 performing communication with the various components described above in FIG. 1, a storage unit 130 storing information collected through the communication unit 120 and the power rate system, a display unit 160 displaying the collected amount of power consumption, and a control unit 150 controlling the components described above.

Specifically, the power measurement unit 110 measures analog measurement values of a current value and a voltage value which flow on the power supply line supplied to the home network 50. That is, the power measurement unit 110 may include a current transformer detecting a current amount by hardware and a potential transformer detecting a magnitude of the voltage. The power measurement unit 110 transfers the measured measurement value to the control unit 150.

The communication unit 120 communicates with other smart meters included in the home network 50, the EMS 30, and the power plants 20 and 40 that produce the renewable energy.

Specifically, the communication unit 120 serves to request the power determined by the control unit 150 based on the power rate system. Further, the communication unit 120 may receive a signal requested by another smart meter 100 of the home network 50.

The communication unit 120 may receive a request which the electronic device 200 transfers in real time and transfer a control signal of the control unit 150 to the electronic device 200. As an example, a plurality of electronic devices 200 included in the home network 50 may transfer data for a power amount required for an operation in real time and the communication unit 120 may receive the request. Further, the communication unit 120 may transfer, to the plurality of electronic devices 200, data for the power amount to be supplied according to a priority through the control signal.

Meanwhile, the communication unit 120 may include one or more components that enable communication with an external device and may include, for example, at least one of a short-range communication module, a wired communication module, and a wireless communication module.

The short-range communication module may include various short-range communication modules transmitting/receiving the signal by using a wireless communication network in a short range, which include a Bluetooth module, an infrared communication module, a radio frequency identification (RFID) communication module, a wireless local access network (WLAN) communication module, an NFC communication module, a Zigbee communication module, and the like.

The wired communication module may include various cable communication modules including a universal serial bus (USB) module, High Definition Multimedia Interface (HDMI), Digital Visual Interface (DVI), recommended standard232 (RS-232), power line communication, or plain old telephone service (POTS), and the like in addition to various wired communication modules including a local area network (LAN) module, a wide area network (WAN) module, or a value added network (VAN) module.

The wireless communication module may include wireless communication modules supporting various wireless communication schemes, which include a global system for mobile communication (GSM), a code division multiple access (CDMA), a wideband code division multiple access (WCDMA), and a universal mobile telecommunications system (UMTS), Time Division Multiple Access (TDMA), Long Term Evolution (LTE), etc., in addition to a Wi-Fi module and a wireless broadband module.

The communication module includes all communication interfaces including an antenna and a transmitter transmitting/receiving wired and wireless signals.

The storage unit 130 stores various data including a program required for operating the smart meter 100, the amount of power consumption collected from the power measurement unit 110, information on the power rate system for the power currently supplied by the power plant 10, etc.

Here, the power rate system as a price which a supplier that manages the power charges for the use of the power of the demand includes various rate systems including a progressive system, a real-time rate system, a two-part RTP, a peak rate system, a time of use (TOU), a TOU+Block rate system, and the like.

The progressive system is a scheme that increases a power rate price according to the amount of power consumption. Representatively, in Korea, the power rate is divided into residential, general, educational, industrial power rates, etc., according to the purpose of using the power, and differentially applied and the progressive system is applied only to a home power rate. A detailed description of the progressive system will be described in detail through FIGS. 4 and 5.

Real time pricing (RTP) refers to a rate system in which a power rate is changed by a time period based on a wholesale or retail price. The RTP and the TOU are similar in that there is a difference in power rate for each time, but unlike the TOU, in the case of the RTP, since the power rate is variable according to a power system operation and a demand and supply situation, a variable rate should be able to be provided to consumers in real time (at least every 5 minutes). In the RTP, a customer baseline load (CBL) and a standard rate are set. In addition, the standard rate is applied to the amount of power consumption less than the customer baseline load (CBL) and the power rate according to the RTP is applied to the amount of power consumption more than the CBL, thereby reducing price variability of the power rate.

The TOU is a scheme of reflecting, when there is a large difference in amount of power consumption according to a season and a time, the large difference and differentially charging a rate in the form of two parts (on-peak and off-peak) or three parts. The TOU is being implemented in most countries and applied to large-scale homes in Korea, and for each of spring/autumn, summer, and winter, the rate is differentially charged in three time zones according to a power demand.

The TOU+Block rate system refers to a scheme that differentiates the price according to a usage for each period of time.

The two-part RTP is different from the TOU+Block rate system in that a customer-based load rate (i.e., reference rate) is predetermined and refers to a scheme of pricing according to the RTP when a customer-based load (i.e., reference usage) or more is used.

The peak rate system is a system in which a power supply company notifies consumers of a peak level power price in advance and implements the system in a time zone in which a power demand is high. The peak rate system may be applied only to a limited time throughout the year in parallel with the TOU. The peak rate system is mainly by European and American electric power companies.

Hereinafter, the progressive system will be described as a representative embodiment of the power rate system. However, the power rate system is not particularly limited to the progressive system and includes the power rate system which those skilled in the art may easily change and apply a technology to be described below.

Referring back to FIG. 2, the storage unit 130 may be implemented as at least one of non-volatile memory devices such as a cache, a Read Only Memory (ROM), a Programmable ROM (PROM), an Erasable Programmable ROM (EPROM), an Electrically Erasable Programmable ROM (EEPROM), and a Flash memory, a volatile memory device such as a Random Access Memory (RAM), or a storage medium such as a hard disk drive (HDD) or a CD-ROM, but is not limited thereto. Further, the storage unit 130 may be a memory implemented as a separate chip in association with the control unit 150 to be described below and also implemented as a processor and a single chip.

The display unit 160 outputs the collected amount of power consumption to a user. Further, the display unit 160 may display both information on the applied power rate system and information on the charged rate and perform an interface function to change a communication result of the communication unit 120 into a digital from and display the digital from.

The display unit 160 may be provided as a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel, or an organic light emitting diode (OLED) panel, but is not limited thereto.

The control unit 150 is a processor that controls all components of the smart meter 100.

Specifically, the control unit 150 compares the amount of power consumption collected by the power measurement unit 110 with the power rate system currently applied and requests an additional power amount through the communication unit 120.

Specifically, the control unit 150 compares the amount of power consumption with a power interval based on a predetermined range. When the power rate system to which the power interval in which the rate is changed is applied is used, the control unit 150 may determine to additionally request renewable energy to the outside before entering the predetermined range of the power interval in which the rate is changed. Therefore, the control unit 150 may prevent an excessive power rate from being charged to the user. A detailed description determined by the control unit 150 will be described through FIGS. 4 to 7.

The control unit 150 may be implemented as a memory (not illustrated) storing an algorithm for controlling operations of the components in the smart meter 100 or data for a program for reproducing the algorithm and a processor (not illustrated) performing the aforementioned operations by using the data stored in the memory. In this case, the memory and the processor may be implemented as separate chips, respectively. Alternatively, each of the memory and the processor may be implemented as a single chip.

At least one component may be added or deleted in respect to performances of the components of the smart meter 100 illustrated in FIG. 2. Further, mutual locations of the components may be changed according to the performance or structure of the system. Further, respective components illustrated in FIG. 2 means hardware components such as software and/or field programmable gate array (FPGA) and (application specific integrated circuit (ASIC).

Figure 3:
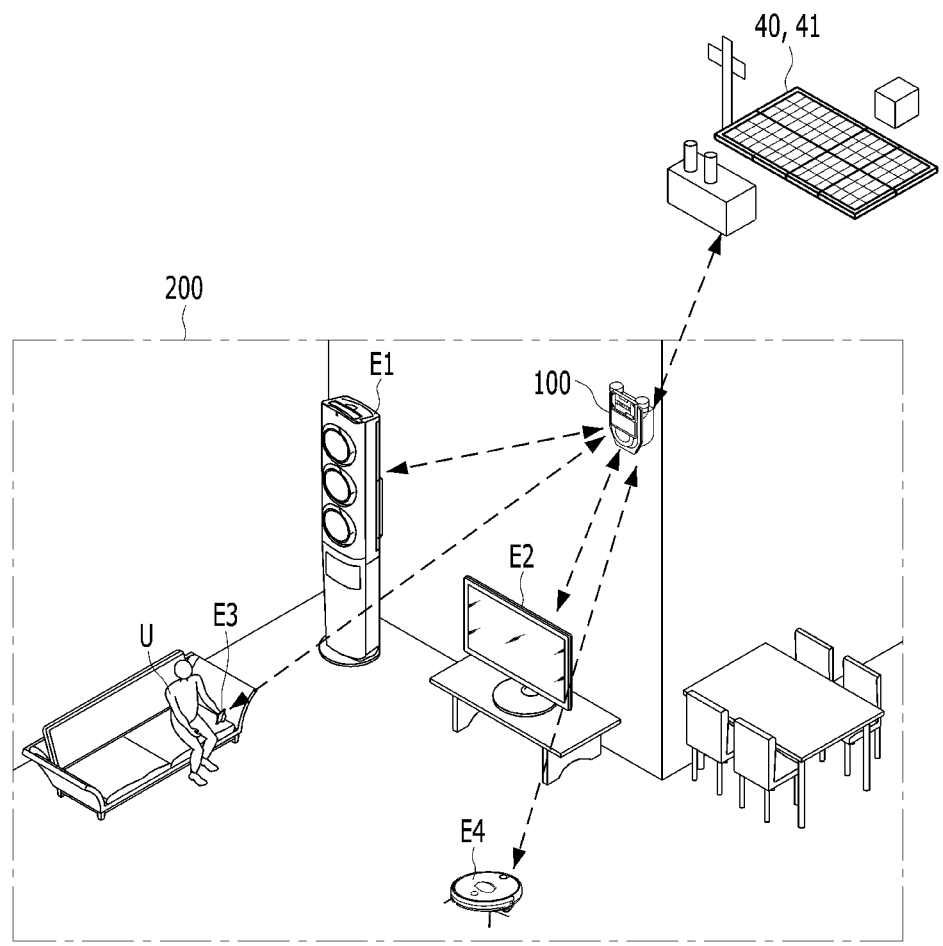
FIG. 3 is a diagram for describing an indoor environment in which a smart meter operates in a home network according to an embodiment.

FIG. 3 is a diagram for describing an indoor environment in which a smart meter operates in a home network according to an embodiment.

In the disclosed embodiment, the smart device 100 may serve as a gateway indoors of the home network as illustrated in FIG. 3. That is, the smart device 100 may interlock with various IoT devices which exist indoors.

Here, the IoT device as various electronic devices 200 which exist in life means a device which may send and receive data by accessing the home network through the embedded communication module. For example, the IoT device includes all wearable type user terminals such as a smartphone, a watch, and glasses in addition to home appliances such as a refrigerator, an air-conditioner a display device, a cleaning robot, lighting equipment, a wine refrigerator, a washing machine, a desktop, etc.

The home network means a network that provides a passage capable of sending and receiving data with all indoor IoT devices and enables accessing an external Internet network.

The disclosed smart meter 100 determines the amount of power consumption to be externally requested based on the data transferred by the IoT device. Specifically, the smart meter 100 may collect data which the IoT devices transfer to each other and a plurality of electronic devices 200 may determine the amount of power consumption required for a future operation based on the collected data.

According to one example illustrated in FIG. 3, when the electronic device 200 includes an air conditioner E1, a display device E2, a portable terminal E3, and a cleaning robot E4, a user U may reserve a time for an operation start in the air conditioner E1 and the cleaning robot E4 through the portable terminal E3. The air conditioner E1 and the cleaning robot E4 set the operation time according to a command of the user U and transfer information on the operation time and information on a power amount required for the operation to the smart meter 100.

The smart meter 100 receives the information from the air conditioner E1 and the cleaning robot E4. The smart meter 100 may determine a required amount of power consumption to be used for the operation of the electronic device 200 based on the received information and the power rate system and request the renewable energy according to a determination result.

Meanwhile, the smart meter 100 may request the renewable energy based on the location of the home network 50 with the smart meter 100. Specifically, the smart meter 100 requests required power from a solar power generator 41 installed outdoors.

However, when the solar power generator 41 is not installed in the home network 50, the smart meter 100 may request the renewable energy stored in the smart meter 100 in a close home network or request the renewable energy from the EMS 30 and the solar power generator 40.

Figure 4:
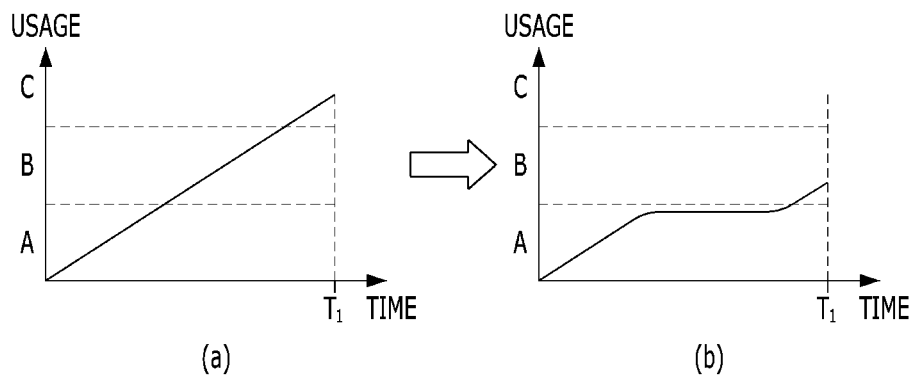
FIG. 4 is a diagram for describing a power rate system the resulting control method according to an embodiment.

FIG. 4 is a diagram for describing a power rate system and the resulting control method according to an embodiment.

The disclosed smart meter 100 compares the amount of power consumption with a predetermined power interval. Here, the power interval may be diversified according to the power rate system and as an example, the power interval may be classified according to the progressive system.

As described above, the progressive system as a scheme that increases a power rate price according to the amount of power consumption partitions the amount of power consumption into predetermined intervals and differentially applies an applied amount.

Referring to FIG. 4, the progressive system according to one example may be divided into six power intervals A to E and in each power interval, the amount of power consumption used during a unit period may be set in units of 100 kWh. Further, the progressive system increases the applied amount according to the power interval and induces the user to reduce power consumption.

Meanwhile, the progressive system charges electric rate according to the amount of power consumption and the charged rate increases according to the usage. That is, as shown in graph (a) of FIG. 4, when the user uses the power, the amount borne by the user varies.

However, the disclosed smart meter 100 requests the renewable energy from the outside based on the interval of the applied progressive system to prevent the rate from increasing.

Referring to graph b) of FIG. 4, when the amount of power consumption of the user increases near a change of the interval, the disclosed smart meter 100 requests the renewable energy from the outside to adjust the electric rate of the user not to exceed a progressive system application interval.

As a result, when the user uses the same power during the same period T1, the progressive system of interval C may be applied as shown in FIG. 4(*a*) in a conventional general situation. However, as the disclosed smart meter 100 requests and uses the renewable energy from the outside, even though the power is used during the same period T1, the progressive system of interval B is applied, thereby reducing a burden of the electric rate.

Figure 5:
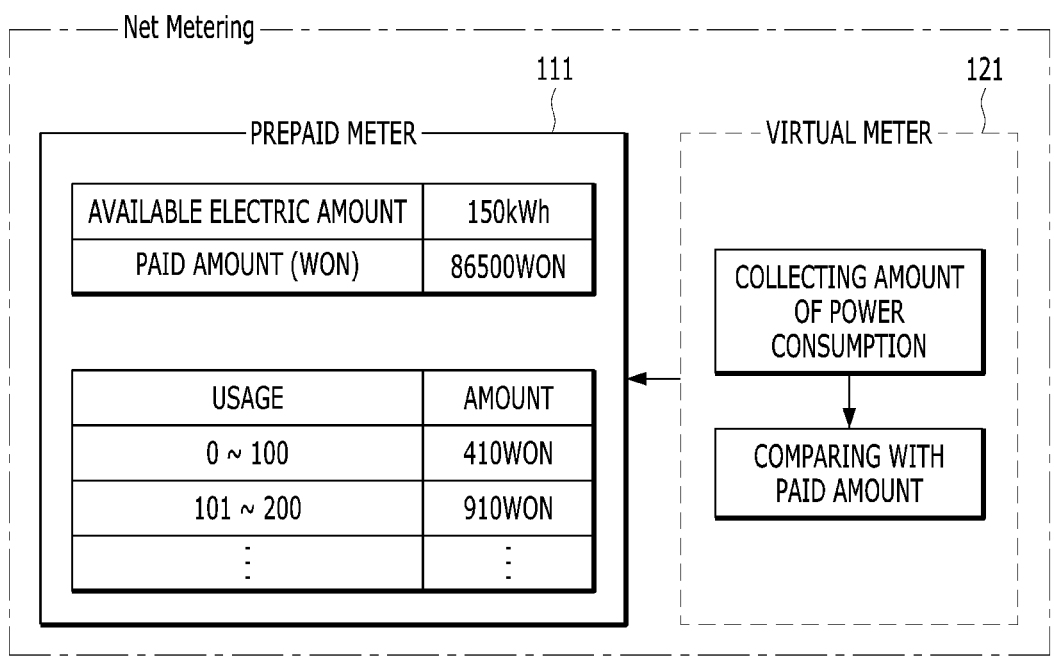
FIG. 5 is a diagram for describing a power rate system the resulting control method according to another embodiment disclosed.

FIG. 5 is a diagram for describing a power rate system the resulting control method according to another embodiment disclosed.

Referring to FIG. 5, the power rate system may be variously applied for each country or region and as another embodiment, a prepaid progressive system may be applied.

The prepaid progressive system means a system in which the user U pays for the amount of power consumption to be used in advance and when the amount of power consumption exceeds power as large as being paid, power supply is stopped.

In the case of the prepaid progressive system, a prepaid meter 111 may be provided in the home network 50 as illustrated in FIG. 5 and a prepaid payment rate (as an example, 86500 won) and the resulting available power amount (as an example, 150 kWh) may be displayed.

When the disclosed smart meter 100 is applied to the power rate system, the smart meter 100 may adjust the amount of power consumption by software in link with net metering.

Here, the net metering means producing the renewable energy from the demand and selling the produced renewable energy back to a supplier, and refers to a policy to receive a credit by turning a electricity meter upside down. The disclosed smart meter 100 may be applied to determine how much renewable energy is to be requested or produced in connection with the net metering.

Specifically, the smart meter 100 may request, while operating as a virtual meter 121 as illustrated in FIG. 4, the renewable energy from the outside before leaving one power interval of the progressive system before the amount of power consumption is transferred to the prepaid meter 111.

The smart meter 100 may collect the information on the amount of power consumption during a predetermined period and calculate the required amount of power consumption by comparing the power interval and the payment rate of the power rate system. That is, in the case of FIG. 5, the smart meter 100 may confirm that the paid rate is 86,500 won. The payment rate is an amount which exceeds an interval of 0 to 100 kWh based on the power rate system. Therefore, the smart meter 100 may request the renewable energy from the outside when the amount of power consumption up to now is 90 kWh.

Figure 6:
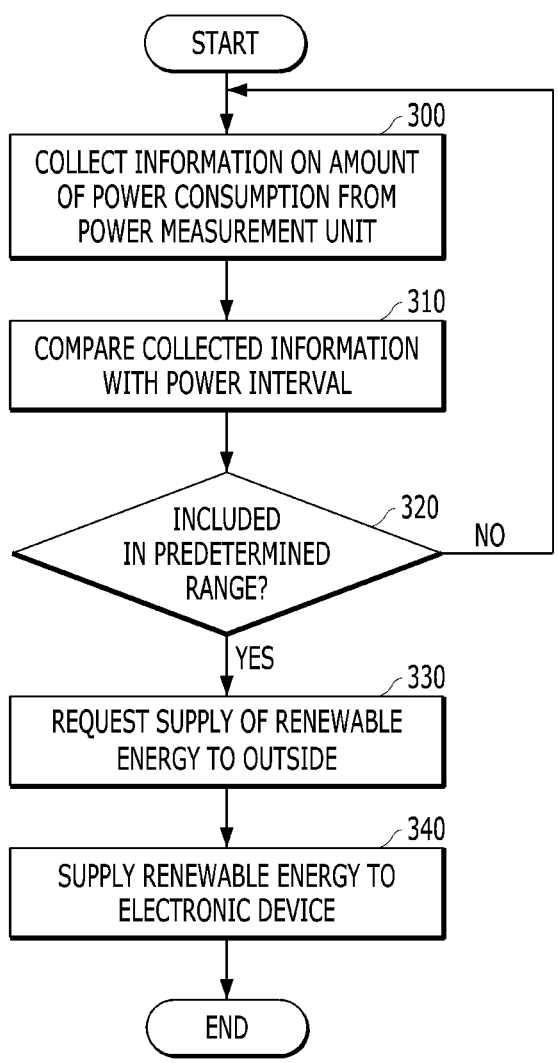
FIG. 6 is a flowchart for a method for controlling a smart meter according to an embodiment disclosed.

FIG. 6 is a flowchart for a method for controlling a smart meter according to an embodiment disclosed.

Referring to FIG. 6, the disclosed smart meter 100 collects information on the amount of power consumption from the power measurement unit 110 (300).

The amount of power consumption may be collected through measurement of a current value and a voltage value which flow on a power supply line.

The smart meter 100 compares the collected information with a power interval (310).

Here, the power interval may be based on the power rate system. Specifically, when the power rate system is the progressive system, the power interval may be determined as an interval in which the rate is changed in the progressive system. However, the power interval does not particularly correspond only to the power rate system and may be changed by setting of the user U.

The smart meter 100 compares the amount of power consumption with the power interval based on a predetermined range (320).

When the amount of power consumption is not included in the predetermined range, the smart meter 100 continuously monitors the amount of power consumption.

Here, the predetermined range is applied according to the power interval and corresponds to an operation start time when the smart meter 100 requests the renewable energy to the outside.

As illustrated in FIGS. 4 and 5, when the power interval is 0 to 100 kWh, the predetermined range may be 90 to 100 kWh. That is, when the amount of power consumption up to now is not included in the range of 90 to 100 kWh, the smart meter 100 may not request the renewable energy to the outside. However, when the amount of power consumption is more than 90 kWh, the smart meter 100 may request the renewable energy to the outside so that the amount of power consumption is not more than 100 kWh.

Meanwhile, the predetermined range may be diversified according to the power interval and the setting of the user.

When the amount of power consumption is within the predetermined range, the smart meter 100 requests the supply of the renewable energy to the outside (330).

Here, the renewable energy is not limited to a self-generating device such as a solar power autonomously provided by the demand. As an example, the smart meter 100 may request the stored power from the EMS 30 and the solar power generator 41 in another home network. A detailed description of a request criterion will be described below through FIG. 7.

When additional power is supplied according to the request from the smart meter 100, the smart meter 100 supplies the supplied renewable energy to the electronic device 200 so that the amount of power consumption is not more than the current power interval (340).

Therefore, the disclosed smart meter 100 prevents overload of generated power and derives efficient power use.

Figure 7:
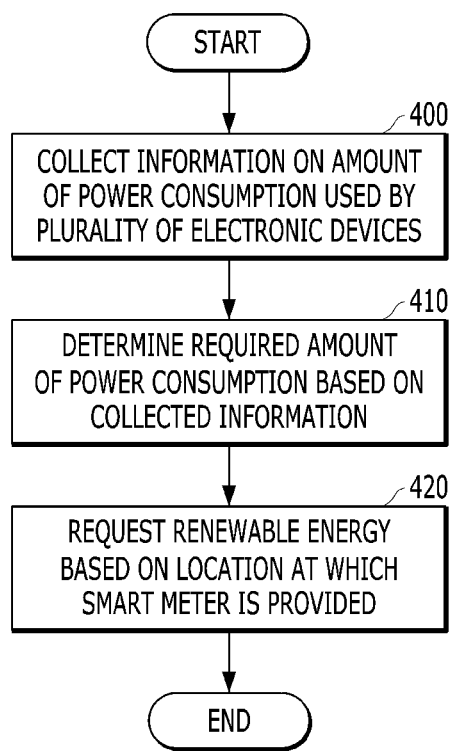
FIG. 7 is a flowchart for specifically describing a method for requesting renewable energy.

FIG. 7 is a flowchart for specifically describing a method for requesting renewable energy.

Referring to FIG. 7, the smart meter 100 may collect information on the amount of power consumption used by a plurality of electronic devices 200 (400).

As described above in FIG. 3, the smart meter 100 is connected to a plurality of electronic devices in the home network 50 as the home network to collect information on whether the operation starts in real time.

As an example, when the user U sets an operation reservation time of the plurality of electronic devices 200, the plurality of electronic devices 200 may transfer an operation start time and an operation time.

The smart meter 100 determines a required amount of power consumption based thereon (410).

Specifically, the smart meter 100 may determine that the current amount of power consumption is not included in the predetermined range described above in FIG. 6. However, the smart meter 100 may determine that the plurality of electronic devices 200 operates in the near future and the amount of power consumption determined based on the operation time is included in the predetermined range.

In this case, the smart meter 100 may calculate the required amount of power consumption based on the determination and request the renewable energy to the outside.

Meanwhile, the disclosed smart meter 100 may request the renewable energy based on the location of the provided home network 50 (420).

As described above in FIG. 1, the smart meter 100 performs communication with another smart meter provided in the home network 50. Accordingly, the smart meter 100 may determine the location of a power storage at a location close to a current location. That is, the disclosed smart meter 100 may request the renewable energy by selecting a predetermined point instead of randomly requesting a request signal.

A control method described in FIG. 7 is just an example and the smart meter 100 does not particularly operate only by the control method.

The invention claimed is:

1. A smart meter interfacing a home network having a plurality of electronic devices with an existing power grid having a power plant producing electricity through at least one of thermal power generation and nuclear power generation, and a renewable energy supply, the smart meter comprising:
    a communication unit configured for communicating with the existing power grid, receiving data of a power amount required for operation from the plurality of electronic devices, and transferring data of a power amount to be supplied according to a priority order through a control signal to the plurality of electronic devices;
    a power measurement unit configured to measure an amount of power consumption from an electronic device in the home network; and
    a control unit comparing the measured amount of power consumption with a predetermined range within a predetermined power interval and requesting renewable energy through the communication unit from the renewable energy supply in response to the measured amount of power being within the predetermined range; wherein the requested renewable energy is received into the home network.

2. The smart meter of claim 1, wherein the communication unit is further configured to request the renewable energy based on a location at which the smart meter is provided.

3. The smart meter of claim 1, wherein the control unit determines the power interval based on a power rate system.

4. The smart meter of claim 3, wherein the control unit determines the power interval based on an input payment rate when the power rate system is a prepaid accumulation rate system.

5. The smart meter of claim 1, wherein the control unit requests the renewable energy from the renewable energy supply based on a required amount of power consumption which the communication unit receives through the electronic device.

6. A system for controlling energy distribution, the system comprising:
    a home network including a smart meter and a plurality of electronic devices in the home network;
    an energy management system (EMS) electrically connected to the smart meter, the EMS storing renewable energy produced by at least one of a solar power plant and a wind power plant; and
    the smart meter supplying the renewable energy received from at least one of the EMS, the wind power plant, and the solar power plant,
    wherein the smart meter includes
    a communication unit configured for communicating with an existing power grid having a power plant producing electricity through at least one of thermal power generation and nuclear power generation, receiving data of a power amount required for operation from the plurality of electronic devices, and transferring data of a power amount to be supplied according to a priority order through a control signal to the plurality of electronic devices,
    a power measurement unit configured to measure an amount of power consumption from the electronic device in the home network, and
    a control unit comparing the measured amount of power consumption with a predetermined power interval and in response to the measured amount of power being a predetermined relation to the predetermined power interval requesting, through the communication unit, renewable energy from at least one of the EMS, the wind power plant, and the solar power plant, wherein the requested renewable energy is received into the home network.

7. The system of claim 6, wherein the control unit compares the amount of power consumption with the power interval based on a predetermined range within the power interval.

8. The system of claim 6, wherein the communication unit is further configured to request the renewable energy based on a user input point of the smart meter.

9. The system of claim 6, wherein the control unit determines the power interval based on a power rate system.

10. The system of claim 9, wherein the control unit determines the power interval based on an input payment rate when the power rate system is a prepaid accumulation rate system.

11. The system of claim 6, wherein the control unit requests the renewable energy from at least one of the EMS, the wind power plant, and the solar power plant based on a required amount of power consumption received from the electronic device.

12. A method for controlling a smart meter, comprising:
    communicating a smart meter with an existing power grid having a power plant producing electricity through at least one of thermal power generation and nuclear power generation;
    collecting, at the smart meter, an amount of power consumption from a plurality of electronic devices in a home network;
    comparing, by the smart meter, the amount of power consumption with a predetermined power interval, the power interval corresponding to the existing power grid;
    requesting, by the smart meter, renewable energy based on the comparison result wherein the requested renewable energy is sufficient to maintain the amount of power consumption within the predetermined power interval; and
    receiving the requested renewable energy into the home network, wherein the smart meter receives data of a power amount required for operation from the plurality of electronic devices and transfers a power amount to be supplied according to a priority order through a control signal to the plurality of electronic devices.

13. The method for controlling a smart meter of claim 12, wherein the comparing by the smart meter includes comparing the amount of power consumption with the power interval based on a predetermined range.

14. The method for controlling a smart meter of claim 12, wherein the requesting by the smart meter includes requesting the renewable energy based on a distance from a location at which the smart meter is provided.

15. The method for controlling a smart meter of claim 12, wherein the comparing by the smart meter includes determining the power interval based on a power rate system.

16. The method for controlling a smart meter of claim 15, wherein the comparing by the smart meter includes determining the power interval based on an input payment rate when the power rate system is a prepaid accumulation rate system.

17. The method for controlling a smart meter of claim 12, wherein the requesting by the smart meter includes requesting the renewable energy from at least one of an energy management system (EMS) electrically connected to the smart meter, the EMS storing renewable energy produced by one of a solar power plant and a wind power plant, the solar power plant and the wind power plant outside the home network, based on a required amount of power consumption received through the electronic device.

18. The smart meter of claim 1, wherein the control unit is further configured to determine a power consumption required for a future operation of the home network based on the measured power consumption.

\* \* \* \* \*